United States Patent [19]
Fujiwara et al.

[11] Patent Number: 5,740,668
[45] Date of Patent: Apr. 21, 1998

[54] HIGH EFFICIENCY GAS TURBINE

[75] Inventors: Tetsuo Fujiwara, Hitachi; Masateru Suwa, Hitachinaka; Yutaka Fukui; Hideki Tamaki, both of Hitachi, all of Japan

[73] Assignee: Hitachi, Ltd., Tokyo, Japan

[21] Appl. No.: 424,614

[22] Filed: Apr. 19, 1995

[30] Foreign Application Priority Data

Apr. 20, 1994 [JP] Japan ................... 6-081272

[51] Int. Cl.$^6$ ........................ F02C 3/00
[52] U.S. Cl. ............. 60/39.75; 415/200; 420/448; 416/241 R
[58] Field of Search ............... 60/39.75, 909; 415/199.5, 216.1, 200; 420/448; 148/427; 416/241 R

[56] References Cited

U.S. PATENT DOCUMENTS 5,077,004 12/1991 Schweizer et al. ............ 420/448
5,360,318 11/1994 Siga et al. ..................... 415/216.1
5,370,497 12/1994 Doi et al. ...................... 415/199.5
5,480,283 1/1996 Doi et al. ...................... 415/199.5

FOREIGN PATENT DOCUMENTS

6-10082  1/1994  Japan.

*Primary Examiner*—Michael Koczo
*Attorney, Agent, or Firm*—Fay, Sharpe, Beall, Fagan, Minnich & McKee

[57] ABSTRACT

A power generation gas turbine includes first stage turbine blades made of an alloy whose $10^5$-hour 14-kgf/mm$^2$ temperature capacity is 920° C. or over, second and subsequent stage turbine blades made of an alloy whose $10^5$-hour 14-kgf/mm$^2$ temperature capacity is 800° C. or over, first stage turbine nozzles made of an alloy whose $10^5$-hour 6 kgf/mm$^2$ temperature capacity is 900° C. or over, and second and subsequent stage turbine nozzles made of an alloy whose $10^5$-hour 6-kgf/mm$^2$ temperature capacity is 800° C. or over.

21 Claims, 7 Drawing Sheets

HIGH EFFICIENCY GAS TURBINE

BACKGROUND OF THE INVENTION

This invention relates to a new high efficiency power generation gas turbine in which the temperature at the turbine inlet is 1500° C. or more.

Improvement of the power generation efficiency in gas turbines has been desired in recent years from the viewpoint of energy-saving and global environment protection. It is well known that the most effective means for such a purpose is to raise gas temperatures. However, the efficiency has been improved so far only with progress in both cooling technology to compensate for the gap between combustion gas temperature and metal temperature, and the material technology to improve the material temperature capacity. As for materials, the key to improving the efficiency is considered to be improving the temperature capacity of blades (moving blades) and nozzles (stationary blades). In conventional gas turbines, an Ni-base alloy is used for blades and a Co-base or an Ni-base alloy is used for nozzles. And, individual materials have been developed for individual members of the subject gas turbine.

Japanese Patent Laid-Open No. 10082/1994 discloses a high efficiency gas turbine that uses a high corrosion resistance high strength Ni-base super alloy for the first stage blade and nozzle respectively.

The above-mentioned conventional technologies are element technologies related to the first stage blade or nozzle. In order to realize a high efficiency gas turbine in the next generation in which the gas turbine inlet temperature (first stage nozzle inlet temperature) is in the 1500° C. range, sophisticated element technologies should be combined and balanced well. If any of the element technologies does not function properly, it would be impossible to realize such a high efficiency gas turbine even if individual element technologies are excellent. In the above-mentioned next generation gas turbine, such a trend will be marked in the extreme. For example, if, when an excellent material is used for blades, a conventional low temperature capacity material is used for the first stage nozzle, then the following problems will arise. The first stage nozzle will not stand the required high temperature and be damaged or deformed, and then the gas flow becomes unstable, since the combustion gas cannot be rectified properly. This causes the load to be applied onto the first stage blade located downstream of the first stage nozzle to be increased. When the first stage blade, whose material characteristics are already improved up to the limit, receives any load larger than the set one, the blade is damaged or deformed, and the load to be applied onto the subsequent blades is increased. With this, it becomes impossible for the gas turbine to achieve its required performance. To avoid these problems, the characteristics of high temperature materials used for blades and nozzles become very important, and the characteristics required for individual members, as well as what materials will satisfy those characteristics should be examined in detail. The most suitable combination of materials should also be selected.

SUMMARY OF THE INVENTION

The purpose of this invention is to provide a high efficiency gas turbine that can satisfy the characteristics of the materials required for all the blades and nozzles, which are specially important items for the next generation gas turbine in which the turbine inlet temperature will become around 1500° C.

Since the first stage turbine blade metal temperature will become 900° C. or over in the next generation 1500° C. range gas turbine even when the cooling technology to be further improved is taken into account, the $10^5$-hour 14-kgf/$mm^2$ temperature capacity of material itself must be 920° C. or over. The second stage and subsequent blades are hit by a high temperature gas, which gas temperature is 50 to 100° C. lower than the temperature of the gas that hits the first stage blade. In spite of this, the metal temperature is still higher than that of the conventional gas turbines in which combustion temperature is around 1300° C. The $10^5$ hour 14-kgf/$mm^2$ temperature capacity must thus be 800° C. or over to satisfy the required material characteristics. If any lower strength material is used, the possibility that blades will be damaged during operation will become very high. In addition, the gas flow energy cannot be changed properly to rotation power. As a result, the efficiency is lowered.

The fuel gas used in power generation gas turbines contains many elements such as $Na_2SO_4$, NaCl, etc. that promote high temperature corrosion of turbine materials. The quantity of those elements is larger than that of the gas turbine fuel for aircraft. This is why the high temperature corrosion resistance for high temperature members, especially that for the first stage blade, becomes very important. To satisfy this condition, the first stage blade uses an alloy that satisfies the corrosion resistance with which the weight loss by corrosion can be suppressed to 600 mg/$cm^2$ or under after it is dipped completely in 75 weight % $Na_2SO_4$— 25 weight % NaCl mixed salt, then heated at 940° C. for 50 hours, estimating the actual corrosion atmosphere to be applied for the real gas turbine.

The first stage nozzle is exposed to the highest temperature, since it receives the combustion gas first in the turbine. It also receives very high thermal stress and thermal impact caused by the repetition of the gas turbine start/stop operation. In a gas turbine whose combustion gas temperature will reach around 1500° C., therefore, the first stage nozzle must use an alloy whose $10^5$-hour 6-kgf/$mm^2$ temperature capacity is 900° C. or over even when the cooling performance of the turbine itself is taken into account. The second stage and subsequent turbine nozzles must use materials whose $10^5$-hour 14-kgf/$mm^2$ temperature capacity is 800° C., since the metal temperature will become higher than that of the conventional gas turbine in which combustion temperature is around 1300° C., although the nozzles are not exposed to so high temperatures as the first stage nozzle is.

Nozzle members may be welded to repair cracks caused by the thermal stress generated after casting defects occurred in the manufacturing process are repaired or internal cooling parts are built in or used. The welding property of such nozzle members must satisfy the condition that the preheating temperature that suppresses crack occurrence inside the bead formed with 1-path TIG-welding in an area of 80 mm×4 mm on the alloy is 400° C. or over. If the pre-heating temperature is more than 400° C., the welding property will not satisfy the above-mentioned condition and causes defects at welded portions. Such members are not proper as nozzle materials.

In the case of a power generation gas turbine that can achieve the above-mentioned purpose, the temperature of the gas inlet to the first stage turbine nozzle is within 1450° to 1550° C., the first stage turbine blade metal temperature is 920° C. or over, the gas turbine exhaust gas temperature is between 590° to 650° C., and the gas turbine power generation efficiency is 37% or over. The power generation efficiency mentioned here is represented by LHV (Low Heat Value). In the power generation gas turbine of this invention, the first stage turbine blade uses an alloy whose $10^5$-hour 14-kgf/mm² temperature capacity is 920° C. or over, the second stage and subsequent turbine blades use an alloy whose 10⁵-hour 14-kgf/mm² temperature capacity is 800° C. or over, the first stage turbine nozzle uses an alloy whose 10⁵-hour 6-kgf/mm² temperature capacity is 900° C. or over, and the second stage and subsequent turbine nozzles use an alloy whose 105-hour 14-kgf/mm² temperature capacity is 800° C. or over. In addition, in the power generation gas turbine of this invention, the weight loss of the alloy used for the first stage turbine blade is 600 mg/cm² or under after it is dipped completely in 75 weight % Na₂SO₄—25 weight % NaCl mixed salt, then heated at 940° C. for 50 hours. The pre-heating temperature that can suppress cracks occurring inside the bead formed with 1-path TIG-welding at an area of 80 mm×4 mm on the alloy used for the first stage turbine nozzle is 400° C. or under.

The first stage turbine blade uses an Ni-base alloy single crystal cast or unidirectionally solidified cast. The single crystal cast mentioned here is a cast that generates no crystal grain boundary when it is solidified unidirectionally. The unidirectionally solidified cast mentioned here is a cast that generates only crystal grain boundaries that are formed in parallel to the solidifying direction when it is solidified unidirectionally. As a result, these casts are provided with a higher creep strength than that of the isometric texture cast obtained in normal casting. In particular, a single crystal cast temperature capacity is the highest. Even when a unidirectionally solidified cast is used, the same effect as that of single crystal blades can be obtained if heat-shield coating layers are provided for the cast.

The first stage nozzle material requires a welding property that can cope with heat resistance fatigability, corrosion resistance, and repairs. To satisfy all those characteristics together, it would be best to use a Co-base alloy cast provided with heatshield coating layers including a ceramic one, an Ni-base alloy unidirectionally solidified cast provided with heat-shield coating layers, or an Ni-base alloy single crystal cast.

The second stage and subsequent turbine blades, which are not exposed to as high temperatures as the first stage blade is, also require a high temperature strength. This is why an Ni-base alloy that has a high creep strength is used for them. The second stage and subsequent turbine nozzles, which are not exposed to as high temperatures as the first stage nozzle is, also require a high creep strength, since they are fixed to the casing with only one of the side walls and it is retained less firmly when compared with the first stage nozzle fixed to the casing with both side walls. Therefore, they also use an Ni-base alloy that has a higher creep strength than that of Co-base alloys in the target (or use) temperature range.

Considering the above problems and to achieve the second purpose of this invention, one of the following material configurations is adopted for a power generation gas turbine equipped with a compressor; a combustor; turbine blades fixed to a turbine disc and arranged in 3 or more stages; and turbine nozzles arranged in 3 or more stages corresponding to the turbine blades.

(1) The first stage turbine blade is formed as an Ni-base alloy single crystal cast, the first stage turbine nozzle is formed as a Co-base alloy cast provided with thermal barrier coating layers, and the second stage and subsequent turbine blades and the second stage and subsequent turbine nozzles are formed as Ni-base alloy casts.

(2) The first stage turbine blade is formed as an Ni-base alloy single crystal cast, the first stage turbine nozzle is formed as a Ni-base alloy unidirectionally solidified cast provided with thermal barrier coating layers, and the second stage and subsequent turbine blades and the second stage and subsequent turbine nozzles are formed as Ni-base alloy casts.

(3) The first stage turbine blade and the first stage turbine nozzle are formed as Ni-base alloy single crystal casts and the second stage and subsequent turbine blades and the second stage and subsequent turbine nozzles are formed as Ni-base alloy casts.

(4) The first stage turbine blade is formed as an Ni-base alloy unidirectionally solidified cast provided with thermal barrier coating layers, the first stage turbine nozzle is formed as a Co-base alloy cast provided with thermal barrier coating layers, and the second stage and subsequent turbine blades and the second stage and subsequent turbine nozzles are formed as Ni-base alloy casts.

(5) The first stage turbine blade and the first stage turbine nozzle are formed as Ni-base alloy unidirectionally solidified casts provided with thermal barrier coating layers, and the second stage and subsequent turbine blades and the second stage and subsequent turbine nozzles are formed as Ni-base alloy casts.

If an Ni-base single crystal cast is used for the first stage turbine blade, a high temperature capacity can be obtained, since the cast has no crystal grain boundary that causes the creep strength to be deteriorated with high temperatures. In this case, however, it is difficult to manufacture single crystal blades and the manufacturing yield becomes low. This is because the blade is complex in form and grain boundarys are often generated in the manufacturing process, since it has complex-formed cooling holes. If even one grain boundary exists in a single crystal cast made of a conventional single crystal alloy, the crystal grain boundaries are weakened and the strength of the whole blade is deteriorated. Such a blade cannot be used for the next generation gas turbine. In addition, the grain boundary generated on the surface of the blade can be checked visually, but internal grain boundarys generated along cooling holes cannot be detected with any technologies at present. To cope with such a problem, it is effective to let one or more of additional elements B, C, Hf, and Zr that reinforce the crystal grain boundaries be contained in the Ni-base alloy used to manufacture single crystal casts. The contents of additional elements must be 1 weight % or under in total. Since fine deposits such as carbide, etc. exist on crystal grain boundaries in this case, the strength of the whole blade can be kept without lowering the grain boundary strength so much even when any grain boundary is generated on the inside walls of cooling holes. If those elements are added to the alloy more than 1 weight % in total, the liquid temperature is lowered significantly, which makes it difficult to keep the required high temperature strength.

In order to improve the thermal efficiency of a gas turbine, the most effective method is to raise the temperature of the combustion gas as mentioned above. If the first stage turbine blade metal temperature is set to 920° C. or over taking the combined use of high quality blades, cooling technology for nozzles, and thermal barrier coating technology into account, then the temperature at the gas inlet to the first stage turbine nozzle can be set to 1450° to 1550° C. With this, 37% or over can be expected as the power generation efficiency of the subject gas turbine. In this case, the power generation efficiency is represented by the LHV system. If the turbine exhaust gas temperature is assumed to be 590° to 650° C. at this time, 55% or over can be expected as the total power generation efficiency when a combined power generation system is adopted using steam turbines together. Thus, an excellent high efficiency power generation system can be realized.

In this invention, materials for blades and nozzles were examined to find the most suitable combination of them to realize a high efficiency gas turbine in the next generation that can cope with a turbine inlet temperature of 1500° C. range. Hereafter, the materials for the first stage blade and nozzle and for the second stage and subsequent blades and nozzles selected from among the elements of the gas turbine will be explained, focusing on the actions of the most suitable materials on individual members of these blades and nozzles.

The gas turbine blades are located downstream of the nozzles in the combustion gas flow. They transmit the kinetic energy of the gas flow to the turbine rotor. The rotation speed of a gas turbine is about 10,000 to several thousands rpm. Those blades are then exposed to a large centrifugal force, a creep stress to be generated during operation, and an abrupt changeable thermal stress by the start/stop operation of the turbine. They also must stand high temperature corrosion to be caused by the elements contained in the combustion gas. In particular, the first stage blade must stand the most severe ambient conditions among the high temperature members of the subject gas turbine. To cope with these problems, the first stage blade uses an alloy whose $10^5$-hour 14-kgf/mm$^2$ temperature capacity is 920° C. or over in the gas turbine of this invention. Its material is an Ni-base alloy single crystal cast or unidirectionally solidified cast. The material has a higher temperature creep strength than that of the equiaxed crystal to be obtained from conventional casting. The temperature capacity can thus be improved more. Especially, the single crystal blade can assume a $10^5$-hour 14-kgf/mm$^2$ temperature capacity of 920° C. or over when a single crystal Ni-base super alloy whose alloy elements are adjusted is used. If a unidirectionally solidified cast is used for the first stage blade, the temperature capacity usually becomes lower than that of single crystal casts. This is why a lower metal temperature is adopted. However, if the blade is coated with thermal barrier layers, the metal temperature can be lowered by 52° to 100° C., and the same strength as the single crystal blade can be obtained.

If the first stage blade uses an alloy whose corrosion resistance is a weight loss of 600 mg/cm$^2$ or under after it is dipped in mixed salt of 75 weight % $Na_2SO_4$—25 weight % NaCl that imitates the actual corrosion atmosphere and heated at 940° C. for 50 hours, then the blade has the characteristics enough to stand the required turbine inlet temperature of 1450° C. or over. Using such an alloy for the first stage turbine blade will result in a long life and high efficiency gas turbine.

The second stage and subsequent blades, which are not exposed to as high temperatures as the first stage blade is, also require a high temperature strength, since they receive a strong centrifugal force caused by the high rotation speed of the turbine. These turbine blades use an alloy whose $10^5$-hour 14-kgf/mm$^2$ temperature capacity is 800° C. or over. The material is an Ni-base alloy whose high temperature strength is more excellent than that of Co-base alloys. For this Ni-base alloy element configuration, the welding property is not taken into consideration, but the high temperature strength is regarded as very important. Even an equiaxed crystal to be obtained from conventional casting can achieve the required strength. Only by combining the second stage and subsequent blades made of such a material with the first stage blade made of a higher strength material, can the high efficiency gas turbine of this invention be realized.

The gas turbine nozzle accelerates the high temperature gas flow from the combustor and transmits the energy to the rotor blades. They are exposed to high temperature combustion gas and receives high thermal stress and impact caused by the repetitive start/stop operation of the gas turbine. In addition, they may be welded in some cases to repair cracks generated by the thermal stress caused after a casting defect which occurred in the manufacturing process is repaired or internal cooling parts are built in or used. The heat fatigability resistance, corrosion resistance, and weldability are considered to be important characteristics of the materials of such nozzles.

The first stage turbine nozzle is exposed to the highest temperature, since it receives the combustion gas first in the turbine. In the gas turbine of this invention, the first stage nozzle uses an alloy whose $10^5$-hour 6-kgf/mm$^2$ temperature capacity as a creep strength is 900° C. The material is a Co-base alloy provided with heat-shield coating layers including a ceramic one. In general, the Co-base alloy has a welding property sufficient to be used as a nozzle member. In addition, when the alloy elements are adjusted, the above-mentioned required strength characteristics can be satisfied completely. When heat-shield coating layers are provided to the alloy, it can stand a turbine inlet temperature of 1450° C. or over. The first stage nozzle can also use an Ni-base alloy single crystal or an Ni-base alloy unidirectionally solidified material provided with heat-shield coating. Other materials will have difficulty satisfying all of these high temperature creep strength, heat fatigability resistance, corrosion resistance, and weldability requirements.

For the second stage and subsequent turbine nozzles, an Ni-base alloy is most suitable. For the second stage and subsequent nozzles, the heat resistance fatigability, corrosion resistance, and welding property in the low temperature range may be lower than those of the first stage nozzle. They use an alloy whose $10^5$-hour 6-kgf/mm$^2$ temperature capacity is 800° C. or over. A nozzle comprises vanes and side walls provided at both ends of each the vane. The first stage nozzle is fixed to the casing with both the side walls and retained firmly. On the other hand, the second stage and subsequent nozzles are fixed to the casing with only one of the side walls and the other side wall is opened. These nozzles are not retained as firmly as the first stage nozzle. They also become larger in size as they are set farther from the first one. This is why these nozzles require a higher creep strength. In case of the Ni-base alloy used for such nozzles, its elements are adjusted to secure the required welding property. Its strength is lower than that of the Ni-base alloy used for blades. When the creep strength is compared between the Ni-base alloy and the Co-base ally used for those nozzles, the strength of the Co-base ally is higher than that of the Ni-base alloy in the first stage nozzle metal temperature range. In the metal temperature range of the second stage and subsequent nozzles, the strength of the Ni-base alloy is higher than that of the Co-base alloy. Therefore, it would be preferred for the gas turbine of this invention to use the Co-base alloy provided with heat-shield coating for the first stage nozzle and the Ni-base alloy for the second stage and subsequent nozzles.

As explained above, if an Ni-base alloy is used for nozzles, the welding property always becomes a subject of discussion. However, if the pre-heating temperature that causes no cracks inside the bead formed with 1-path TIG-welding on an area of 80 mm×4 mm on the alloy is 400° C. or below, no problem will arise from the welding property. If not, since faults will appear in the welded portions, the alloy is not suitable as the material for nozzles.

So far, explanation has been made for individual materials for blades and nozzles of the gas turbine related to this invention, but actually the above-mentioned requirements must be satisfied at the same time. The high efficiency gas turbine of this invention can be provided only when these requirements are all satisfied. For example, if, when an excellent material mentioned in this invention is used for the first stage blade, a conventional low temperature capacity material is used for the first stage nozzle, then the following problems will arise. The first stage nozzle, which cannot stand the high temperature, is damaged or deformed. Then, the combustion gas cannot be rectified properly by the damaged or deformed nozzle and the gas flow becomes unstable. As a result, the load onto the first stage blade located downstream of the first stage nozzle is increased. Since the first stage blade material characteristics are already improved to the limit, it cannot stand any load to be increased over the set one. This causes the material to be damaged or deformed, as well as the load to be applied onto the materials located downstream of the first stage nozzle to be increased. In this status, the gas turbine will never achieve the required performance.

According to this invention, the most suitable combination of materials can be provided to realize the above-mentioned high efficiency gas turbine. In addition, the above-mentioned problems can be avoided. In other combinations of materials, a gas turbine that can cope with the turbine inlet temperature of 1500° C. range and the high efficiency of 37% or over (represented by LHV) will never be achieved.

DESCRIPTION OF THE PREFERRED EMBODIMENTS

Embodiment 1

Figure 1:
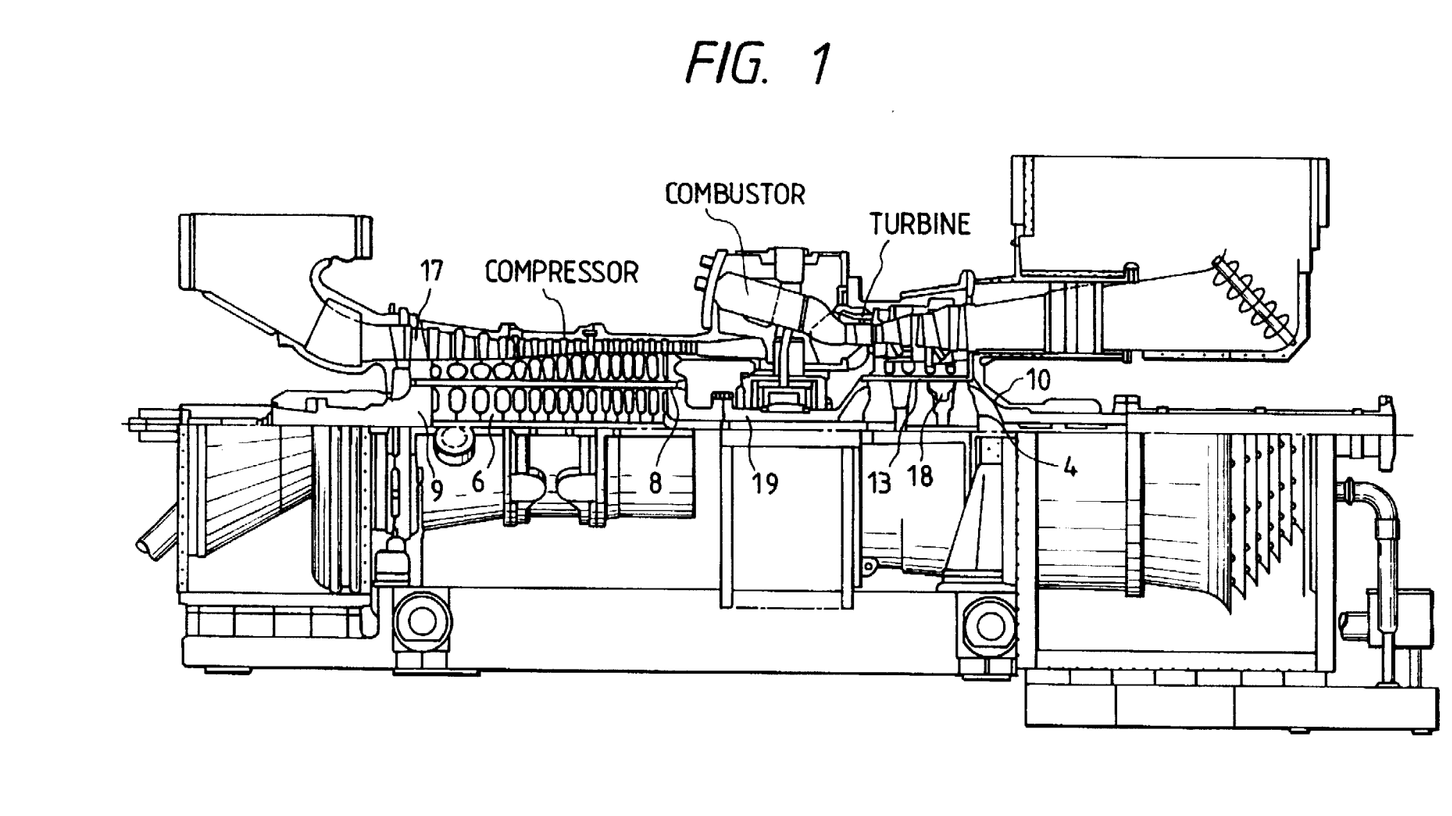
FIG. 1 is a cross sectional view of the rotary part of a gas turbine of the present invention.
Figure 2:
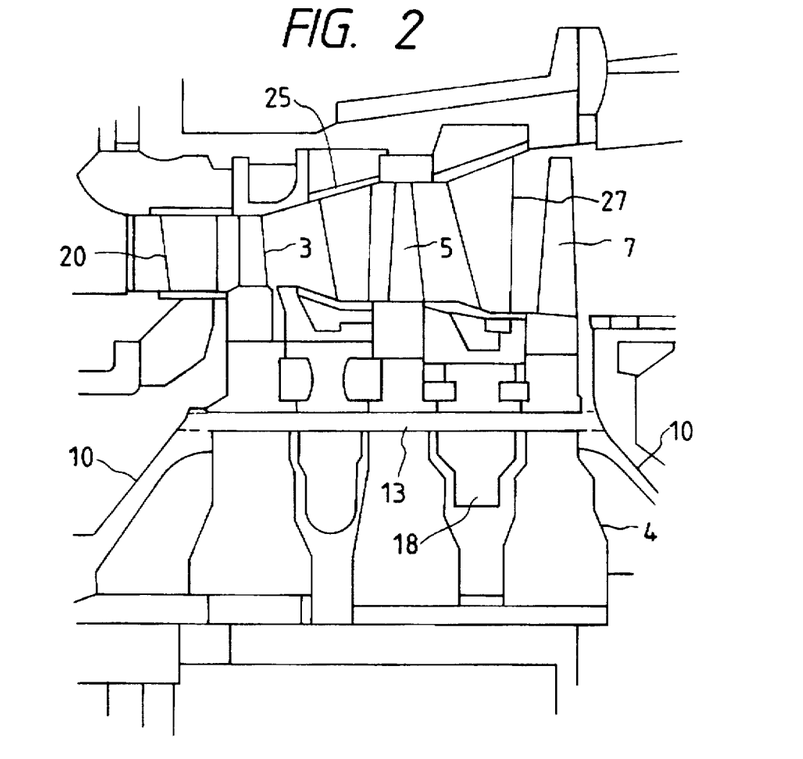
FIG. 2 is an enlarged view of the turbine blade and nozzle position of the gas turbine shown in FIG. 1.

FIG. 1 shows a cross sectional view of the rotary part of the power generation gas turbine of the present invention. FIG. 2 shows an enlarged view of a blade and a nozzle. Reference number 3 is a first stage blade, 5 is the second stage blade, 7 is the third stage blade, 20 is the first stage nozzle, 25 is the second stage nozzle, 27 is the third stage nozzle, 4 is a turbine disc, 10 is a turbine stub shaft, 13 is a turbine stacking bolt, 18 is a turbine spacer, 19 is a distance piece, 6 is a compressor disc, 17 is a compressor blade, 8 is a compressor stacking bolt, and 9 is a compressor stub shaft. The gas turbine in this embodiment is provided with turbine blades and nozzles that are arranged in 3 stages, respectively.

The first stage turbine blade 3 of the gas turbine of this invention is formed as an Ni-base super alloy single crystal cast. The cast alloy comprises Cr 6 to 8%, Mo 0.5 to 1%, W 6 to 8%, Re 1 to 4%, Al 4 to 6%, Ta 6 to 9%, Co 0.5 to 10%, Hf 0.03 to 0.13% by weight, and the balance Ni and unavoidable impurities. The total length of the first stage blade is about 220 mm. The vane length is 130 mm. The $10^5$-hour 14-kgf/mm$^2$ temperature capacity of the blade formed as a single crystal cast is 930° to 940° C. The blade is provided with complex-structured air cooling holes in it. The blade is cooled down by compressed air supplied through these holes during operation. A closed method is adopted as the cooling method and a staggered rib system is adopted as the cooling structure. To improve the corrosion resistance of the blade, an alloy layer that is 50 to 150 μm in thickness and comprises, by weight, Al 2 to 5%, Cr 20 to 30%, Y 0.1 to 1% and residual Ni or Ni+Co is formed on the surface of the blade by plasma spraying under an oxidizable reduced pressure atmosphere. This single crystal cast is applied as a solid-solution treatment at 1250° to 1350° C., then put in aging in two steps; 1000° to 1100° C. and 850° to 950° C. After this, the γ' phase whose one side is 1 μm or under in length is reduced with 50 to 70 volume %.

The second stage and third turbine blades are made of an Ni super alloy that comprises Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, B 0.005 to 0.02% in weight and the balance Ni and unavoidable impurities. Each of these blades has an equiaxed crystal structure to be obtained from conventional casting. The second stage blade has cooling holes inside it and it is cooled down by the compressed air to be supplied through these holes. The $10^5$-hour 14-kgf/mm$^2$ temperature of the material is 840° to 860° C. The surface of each blade is coated with diffused Cr or Al for higher corrosion resistance. A heat treatment is applied to the Ni-base alloy as mentioned above.

The first stage nozzle 20 is made of a conventional casting material (equiaxed crystal structure) of a Co-base super alloy that comprises Cr 24 to 30%, Ni 8 to 12%, W 6 to 9%, Ti 0.1 to 0.4%, Co 8 to 10%, C 0.2 to 0.4%, B 0.005% or under, Fe 1.0% or under, Zr 1.0% or under, Nb 0.3% or under, Hf 1.0% or under, Ta 2.0% or under by weight and the balance Co and some impurities that cannot be eliminated. The $10^5$-hour 6-kgf/mm$^2$ temperature capacity of this alloy is 900° to 910° C. A closed impingement cooling system is adopted for cooling down the first stage nozzle. The outer surface of the first stage nozzle that will be exposed to high temperature flames is protected with thermal barrier coating layers. The coating layers comprises a $Y_2O_3$ stabilized layer of zirconia that is double-structured micro column crystals, each of which is formed with a column crystal of 10 μm or less in diameter formed inside a macro column crystal of 50 to 200 μm in diameter,(the base metal,) and a bonding layer between the zirconia layer and the base metal. The above-mentioned bonding layer is formed with spray coating of an alloy comprising Al 2 to 5% Cr 20 to 30%, Y 0.1 to 1% in weight and residual Ni or Ni+Co. The alloy layers also work to improve the corrosion resistance of the first stage nozzle. This casting material is applied a solution treatment at 1150° to 1200° C., then applied a heat treatment at 820° to 880° C. for the first step aging.

The second stage nozzle 25 and third nozzle 27 are made of an Ni-base super alloy comprising Cr 21 to 24%, Co 18 to 23%, C 0.05 to 0.20%, W 1 to 8%, Al 1 to 2%, Ti 2 to 3%, Ta 0.5 to 1.5%, B 0.05 to 0.15%, in weight, and the balance Ni and some impurities that cannot be eliminated. Those nozzles have an equiaxed crystal structure to be obtained from conventional casting. No special thermal barrier coating layer is needed for those nozzles, but a diffused coating of Cr or Al is formed on them to improve the corrosion resistance. The nozzles are also provided with internal holes for cooling and they are cooled down with the compressed air supplied through those holes. The $10^5$-hour 6-kgf/mm² temperature capacity of the material is 840° to 860° C. The same heat treatment as the above one is also applied to this casting material. The center of each of the second stage and third nozzles is arranged almost in the center between blades.

In this embodiment, the turbine disc 4 is made of an Ni-base forged alloy comprising C 0.03 to 0.1%, Cr 12 to 18%, Ti 1.2% to 2.2%, Fe 30 to 40%, Nb 2.5 to 3.5%, B 0.002 to 0.01%, in weight, and the balance substantially Ni. The above-mentioned Ni-base forged alloy is featured as follows; the $10^5$-hour creep fracture strength at 450° C. is 50 kgf/mm² or over, which can satisfy the strength required for high temperature gas turbine materials.

The compressor blades are arranged in 17 stages, and the available air compression ratio thereby is 18.

Natural gas and light oil are used as fuels for the gas turbine.

With the above-mentioned configuration, the gas turbine in this embodiment will obtain higher reliability and be well-balanced from the comprehensive point of view. In addition, since the temperature at the gas inlet to the first stage turbine nozzle is 1500° C., the first stage turbine blade metal temperature is 920° C., the gas turbine exhaust gas temperature is 650° C., and the power generation efficiency represented by LHV is 37% or over, the gas turbine will be a high efficiency one.

Figure 3:
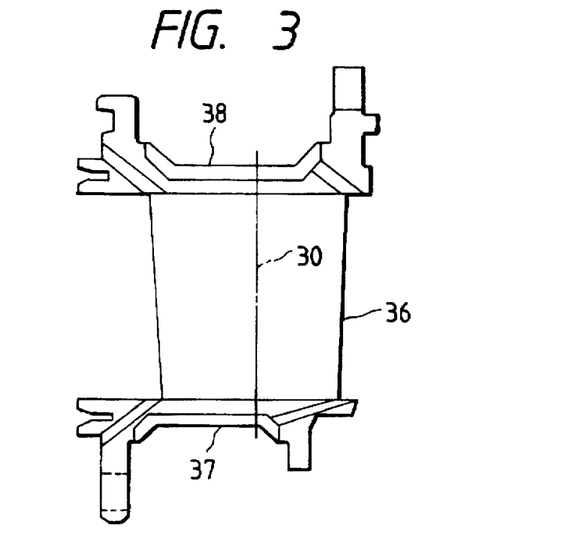
FIG. 3 is a plan view of the first stage turbine nozzle in the gas turbine of the invention.
Figure 9:
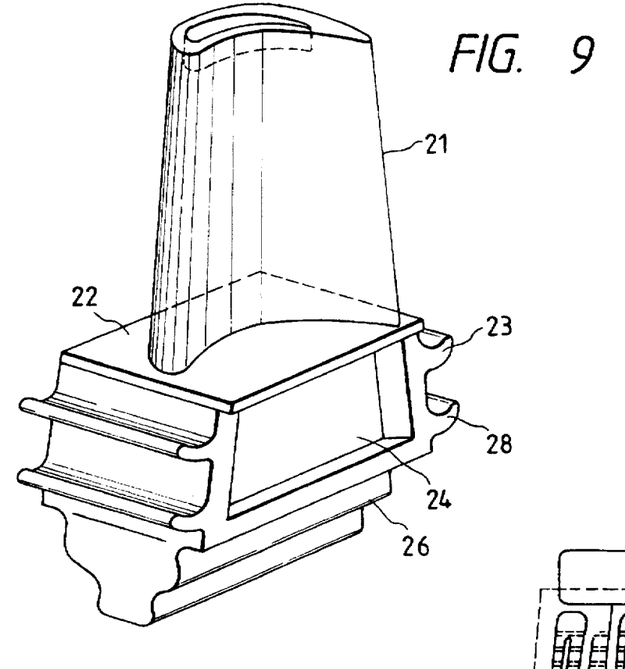
FIG. 9 is a perspective view of the first stage turbine blade in the gas turbine of the invention.

FIG. 3 is a plan view of the first stage nozzle in this embodiment. As shown in the figure, a vane 36 is formed between the outside wall 38 and the inside wall 37 and it is united with both the outer and inner walls. As shown in FIG. 9 to be described later, the vane is like a crescent moon in shape and rounded at one end. It is made of a hollow thin wall material so that cooling air may flow smoothly into the vane. The vane is provided with many holes so that cooling air may flow in from both the side walls and out from the leading edge at the upstream side, as well as from the concave end at the downstream side and the end face at the tip of the concave end. 30 is the center line of the vane.

Figure 4:
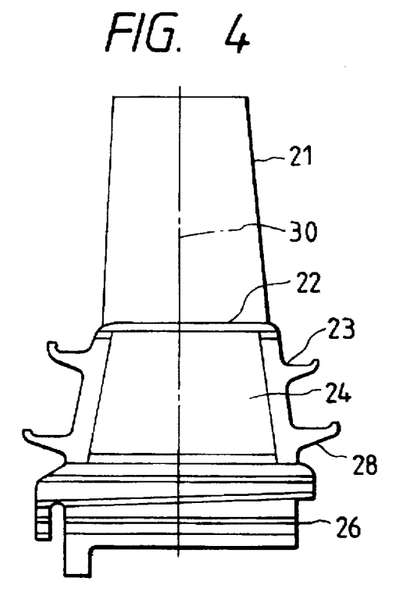
FIG. 4 is a plan view of the first stage turbine blade in the gas turbine of the invention.

FIG. 4 is a plan view of the first stage blade in this embodiment. As shown in the figure, the blade comprises a vane 21, a platform 22, a shank 24, sealing fins 23 and 28, and a dovetail 26. The vane 21, as shown in FIG. 9, is formed like a crescent moon and rounded at one end at the upstream side. The vane 21 is provided with holes through which cooling air flows in from the dovetail 26 and out from the tip of the blade and the end face of the blade at the downstream side in the combustion gas flow. The single crystal cast is manufactured by solidifying the vane, platform, shank, and dovetail in order. Since the platform 22 and the sealing fin 28 are extended at nearly right angles with the vane 21, that is, horizontally, a bypass mold is combined with the main mold so that the tips of the platform 22 and the sealing fin 28 that are bridged with a mold bypassed at a middle point of the vane and the mold body may be solidified at the same time. This combination of the main mold and the bypass mold makes it possible to obtain single crystal blades that are large in size and complex in shape. The tips of the sealing fins 23 and 28 are extended almost at right angles to prevent combustion gas from leaking. 30 is the center line of the first stage blade and it is the same as the center line of the disc 4.

Figure 5:
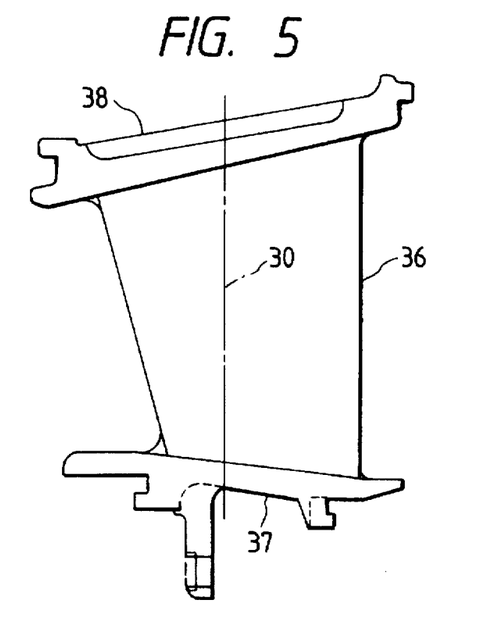
FIG. 5 is a plan view of the second stage turbine nozzle in the gas turbine of the invention.

FIG. 5 is a plan view of the second stage nozzle. The structure of the nozzle in this embodiment is almost the same as the first one. The nozzle has two vanes in this embodiment. The cooling air flows in from the outside wall 38 and out from the inside wall 37. Cooling holes are provided at the tip of each vane and cooling air from the trailing edge located at the downstream of the vane 36 is also discharged from the holes. The vane 36, which is hollow, is formed with a thin wall material which is 0.5 to 3 mm in thickness. The center line 30 is the same as that of the spacer 18. Although the nozzle has two vanes in this embodiment, it may have 1 to 3 vanes.

Figure 6:
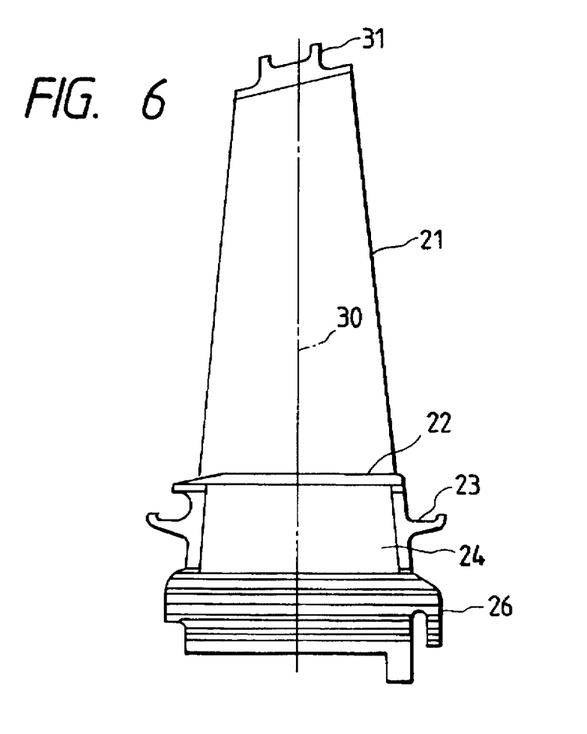
FIG. 6 is a plan view of the second stage turbine blade in the gas turbine of the invention.

FIG. 6 is a plan view of the second stage turbine blade. The structure of the blade is almost the same as the first one. Inside the blade are provided many cooling holes arranged straight so that cooling air may flow from the dovetail 26 side to the end 31 and flow out from the end 31. The center line 30 of the blade is the same as that of the disc 4.

Figure 7:
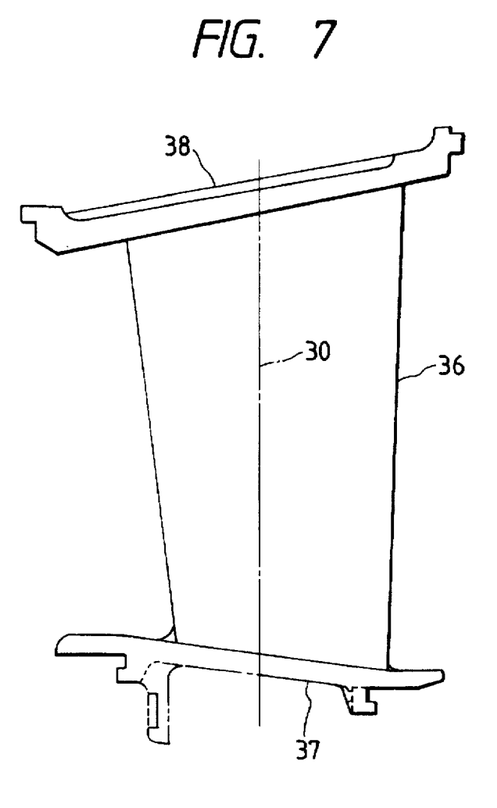
FIG. 7 is a plan view of the third turbine nozzle in the gas turbine of the invention.

FIG. 7 is a plan view of the third stage nozzle. The structure of the nozzle in this embodiment is almost the same as that shown in FIG. 5. The vane 36, which is hollow, of the nozzle is formed with a thin wall material of 0.5 to 3 mm in thickness so that cooling air flows in from the outside wall 38 and out from the inside wall 37. In this embodiment, two vanes are united with the nozzle between both the side walls, but the number of vanes may be any of 1 to 3. The center line 30 of the nozzle is the same as that of the spacer 18.

Figure 8:
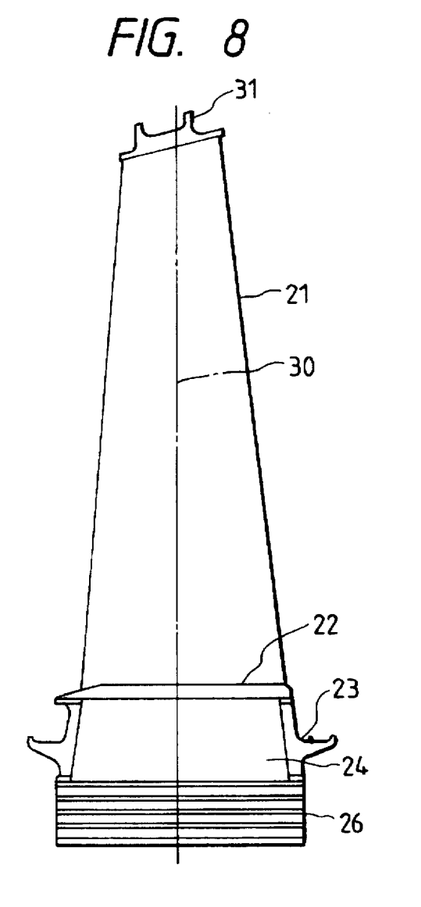
FIG. 8 is a plan view of the third turbine blade in the gas turbine of the invention.

FIG. 8 is a plan view of the third stage turbine blade. In this embodiment, the vane 21 is solid and it has no cooling holes.

In FIGS. 4, 6, and 8, the shanks 24 each are concave deeper than the end of the vane 21 forming the surface of the platform 22 and the top face of the dovetail 26.

The blade length to the length of the vane between the side walls of the nozzle in each stage is 0.9 to 1.2 times (preferably it should be 1.0 to 1.1 times) in the first stage, 1.1 to 1.5 times (preferably it should be 1.2 to 1.4 times) in the second stage, and 1.0 to 1.4 times (preferably it should be 1.1 to 1.3 times) in the third stage. The vane length between side walls in the second stage nozzle to one in the first stage nozzle is 1.2 to 1.6 times (preferably it should be 1.3 to 1.5 times) and the vane length in the third stage nozzle to one in the first stage nozzle is 2.2 to 2.6 times (preferably it should be 2.2 to 2.4 times). The blade length in the second stage blade to one in the first stage blade is 1.5 to 1.9 times (preferably it should be 1.6 to 1.8 times) and the blade length in the third stage blade to one in the first stage blade is 2.5 to 2.9 times (preferably it should be 2.6 to 2.8 times). The length of each blade is measured in the center. The length of the nozzle vane is measured in the center between blades except for the first one. The length of the first stage nozzle vane is measured in the center of the vane.

The nozzle width at the inner periphery to the width at the outer periphery is as follows: 0.80 to 1.05 times for the first stage nozzle (preferably it should be 0.90 to 1.0 times), 0.6 to 0.95 times for the second stage nozzle (preferably it should be 0.7 to 0.85 times), and 0.55 to 0.9 times for the third nozzle (preferably it should be 0.6 to 0.8 times). The width of each vane is measured on a diagonal line extended straight to a contact point when it is set obliquely between both the side walls.

The blade width at the inner periphery to the width at the outer periphery is as follows: 1.1 to 1.6 times for the first stage blade (preferably it should be 1.2 to 1.5 times), 1.4 to 2.2 times for the second stage blade (preferably it should be 1.6 to 2.0 times), and 1.9 to 2.7 times for the third stage blade (preferably it should be 2.0 to 2.5 times). The platform is almost horizontal to the rotary shaft, but the blade at the tip is longer and oblique in the downstream than in the upstream except for the first stage one.

The vanes of the nozzle and blade, which are adjacent, are arranged almost in parallel, but the distance between those vanes is longer at the outer periphery than at the inner periphery. The ratio of the distance between blade vanes at the outer periphery to that at the inner periphery is as follows: 0.01 to 0.03 times for between the first stage blade vanes (preferably it should be 0.015 to 0.025 times), 0.05 to 0.1 times for between the second stage blade vanes (preferably it should be 0.06 to 0.08 times), and 0.01 to 0.05 times for between the third stage blade vanes (preferably it should be 0.02 to 0.035 times).

Figure 10:
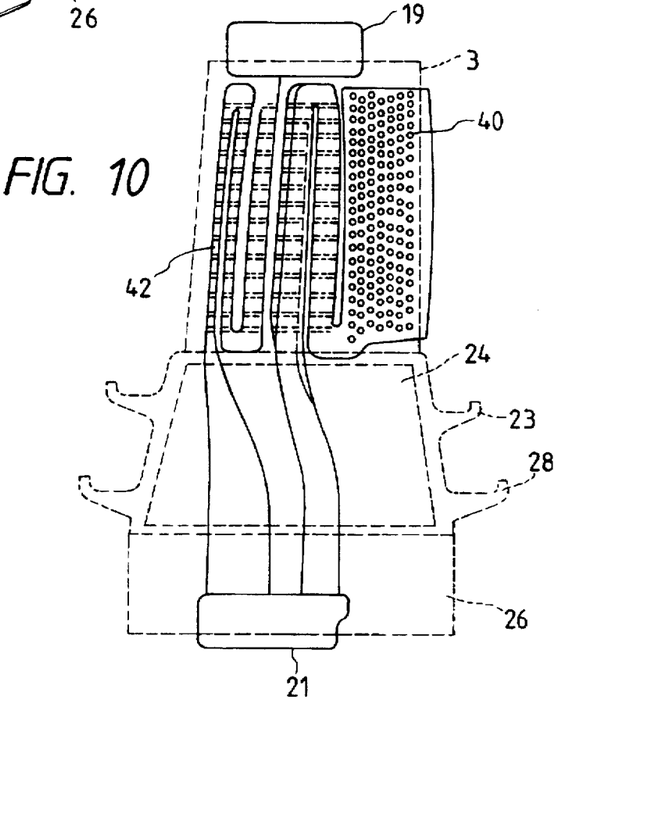
FIG. 10 is a plan view of the core used to manufacture the first stage gas turbine blade the invention.

FIG. 9 is a perspective view of the first stage gas turbine blade. FIG. 10 is a plan view of the core used to provide the hollow structure for cooling holes. A life-sized wax model of the product is formed around this core. In addition, a coating layer of sand to be described later is formed all over the wax model, then the model is dewaxed and baked into a mold. After this, the master ingot of the said composition is cast into the said mold in a vacuum unidirectional solidifying furnace. The cast is solidified unidirectionally from the starter to other items sequentially at a pull-down speed of 5 to 30 cm/h into a single crystal cast using a selector. Then, the core is eliminated with alkalis, and the starter, the selector, and the riser are cut off to obtain the gas turbine blade formed as shown in FIG. 9. The total length of this blade is 220 mm.

When manufacturing a turbine blade as a unidirectionally solidified cast, the blade is solidified at a pull-down speed of 30 to 50 cm/h, which is higher than the pull-down speed set for the blade formed as a single crystal cast.

A solution heat treatment and an aging processing are applied to the obtained blade in an unoxidizable atmosphere to provide the texture with the required strength.

Figure 11:
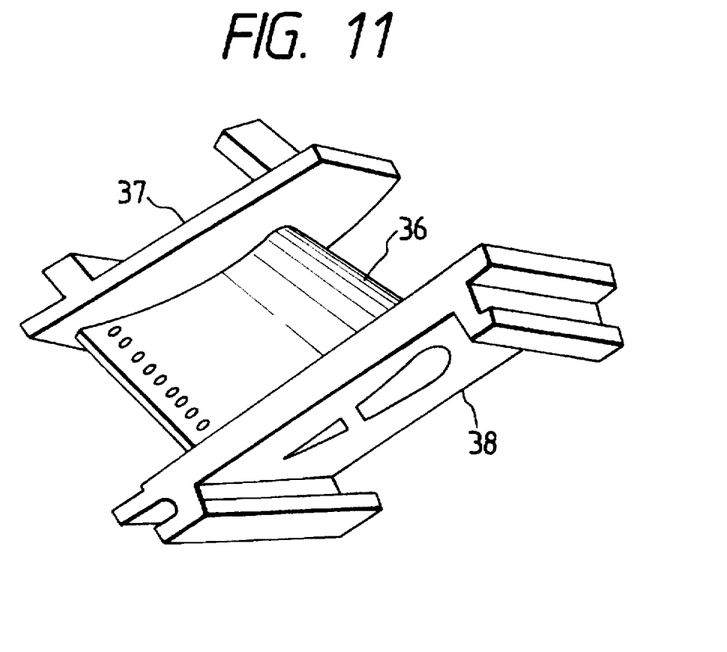
FIG. 11 is a perspective view of the first stage gas turbine nozzle of the invention.
Figure 12:
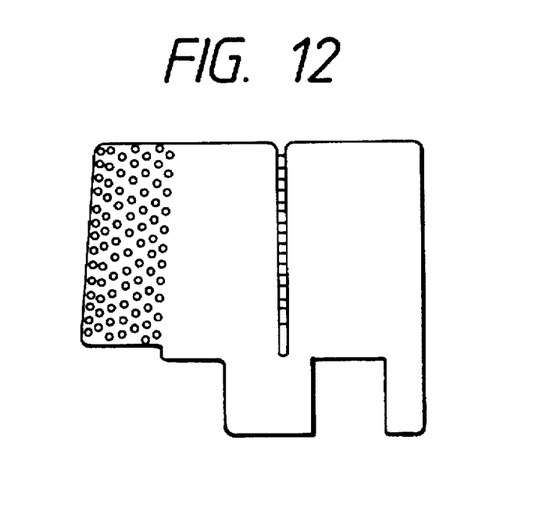
FIG. 12 is a plan view of a core used for manufacturing a first stage gas turbine nozzle of the present invention.

FIG. 11 is a perspective view of the first stage nozzle. FIG. 12 is a plan view of the core used to provide the hollow structure for the cooling holes. A wax model formed around this core is dipped in a solution of methyl ethyl ketone and acrylic resin, then dried with air blowing. After this, it is dipped in slurry (zircon flour+colloidal silica+alcohol) and stucco (first layer: zircon sand, second and subsequent layers: chamotte sand) is blown on it. This cycle of treatment is repeated several times to form the mold. The mold is then dewaxed and baked at 900° C.

This mold is put in a vacuum furnace, and the alloy of the model is melted by means of vacuum melting and cast into the mold in the vacuum status. This cast nozzle's vane between both the side walls is about 74 mm in width, 110 mm in length, and 25 mm in the thickest part, and 3 to 4 mm in wall thickness. It is provided with an air passing slit of about 0.7 mm in width at its tip.

The nozzle is provided with holes for pin fin cooling, impingement cooling, and film cooling. The wall of the slit at the tip of the nozzle vane is about 1 mm in thickness. The SUS304 stainless steel tube that has impingement cooling holes is TIG-welded on the nozzle body all round. Cooling air is flowed in from the cooling holes of the tube. The welded part is sealed completely to prevent air leaks.

A solution heat treatment and an aging processing are applied to the obtained nozzle in an inoxidizable atmosphere to provide the texture with the required strength.

Embodiment 2

The first stage gas turbine blade 3 in this embodiment is provided with almost the same structure as that in the embodiment 1. It is an Ni-base super alloy unidirectionally solidified cast. The Ni alloy comprises Cr 5 to 16%, Mo 0.3 to 2%, W 2 to 9%, Al 2.5 to 6%, Ti 0.5 to 5%, Ta 1 to 4%, Co 8 to 10%, C 0.05 to 0.15%, B 0.005 to 0.02%, in weight, and the balance Ni and some impurities that cannot be eliminated. The total length of the first stage blade is about 220 mm. The $10^5$-hour 14-kgf/mm$^2$ temperature capacity of this unidirectionally solidified cast is 890° to 900° C. It is provided with thermal barrier coating layers to lower the material metal temperature just like in embodiment 1. The unidirectional solidification is done sequentially from the vane side to the dovetail to form the blade with columnar grains. The column crystal is 2 to 10 mm in diameter. It is small at the vane and becomes larger at the shank. The unidirectional solidified cast is then has applied to it a heat solution treatment at 1200° to 1280° C., then aging applied in two steps at 1000° to 1150° C. and at 800° to 950° C. As a result, the γ phase that is 2 μm or under in side length is reduced by 50 to 70 volume %. Preferably, the phase should be reduced by 60 to 65 volume %.

The second stage blade 5 and the third stage blade 7 are the same as those in embodiment 1.

The first stage nozzle 20 is made of the same alloy as that in the embodiment 1, but heat-shield coating layers are structured as follows. Layers are 4 in total, which are formed from the surface to the base material in the order of $Y_2O_3$ stabilized zirconia spraying layer, alloy layer, mixed layer of ceramic and alloy, and bonding layer. These layers function as thermal barrier ring, thermal stress reduction, and corrosion resistance. The above-mentioned bonding layer is an alloy comprising Al 2 to 5%, Cr 20 to 30%, Y 0.1 to 1%, in weight, and residual Ni or Ni+Co.

The second and third stage nozzles are the same as those in the embodiment 1. They are formed with an Ni-base super alloy comprising Cr 21 to 24%, Co 18 to 23%, C 0.05 to 0.20%, W 1 to 8%, Al 1 to 2%, Ti 2 to 3%, Ta 0.5 to 1.5%, B 0.05 to 0.15% , in weight, and the balance Ni and unavoidable impurities. There is no need to provide thermal barrier coating layers for them specially, but the second stage nozzle is provided with an alloy layer comprising Al 2 to 5%, Cr 20 to 30%, Y 0.1 to 1%, in weight, and residual Ni or Ni+Co, in order to raise corrosion resistance. The nozzle has cooling holes in it and it is cooled down with cooling air supplied from those holes. The $10^5$-hour 6-kgf/mm$^2$ temperature capacity of those materials is 840° to 860° C.

In this embodiment, the turbine disc 4, the turbine stub shaft 10, and the turbine stacking bolt 13 use heat-resistant steel that has a full-tempered martensite texture comprising C 0.05 to 0.2%, Si 0.5% or under, Mn 1% or under, Cr 8 to 13%, Ni 3% or under, Mo 1.5 to 3%, V 0.05 to 0.3%, Nb 0.02 to 0.2%, N 0.02 to 0.1%, in weight, and the balance substantially Fe. The heat-resistant steel has properties as follows: the heat resistance is 450° C., the $10^5$-hour creep fracture strength is 50 kgf/mm$^2$, the 20° C. V Notch Charpy impact strength is 7 kg-m/cm or over. The heat-resistant steel can satisfy the required strength for high temperature gas turbine materials. The heat-resistant steel also has a ferrite crystal structure, but ferrite materials have a smaller thermal expansion coefficient than austenite materials such as Ni-base alloy. The disc material thermal expansion coefficient will thus be controlled smaller to reduce the thermal stress, cracks, and other damages to be generated in the disc in this embodiment that uses the said heat-resistant steel for the turbine discs than that in the embodiment 1 that uses an Ni-base alloy for the turbine disc.

The compressor blades are arranged in 17 stages and the available air compression ratio thereby is 18.

Natural gas and light oil are used as fuels.

With the above-mentioned configuration, the gas turbine in this embodiment will obtain higher reliability and be well-balanced from a comprehensive point of view. In addition, since the temperature at the gas inlet to the first stage turbine nozzle is 1500° C., the first stage turbine blade metal temperature is 900° C., the gas turbine exhaust gas temperature is 650° C., and the power generation efficiency represented by LHV becomes 37% or over.

Embodiment 3

In addition to the material configurations shown in the two embodiments, the invention can also have the following material configurations.

(1) As in Embodiments 1 and 2, the first stage nozzle is formed as a unidirectional solidified cast of an Ni-base super alloy. The Ni-base super alloy comprises Cr 5 to 16%, Mo 0.3 to 2%, W 2 to 9%, Al 2.5 to 6%, Ti 0.5 to 5%, Ta 1 to 4%, Co 8 to 10%, C 0.05 to 0.15%, B 0.005 to 0.02% in weight, some impurities that remain unavoidably, and Ni. This undirectional solidified cast is manufactured in the same way as in Embodiment 2. The 10$^5$-hour 14-kgf/mm2 temperature capacity of the material is 890° to 900° C. The nozzle is cooled down during operation with compressed air by means of the impinge cooling system. The nozzle is provided with heat-shield coating layers to lower the material metal temperature just like in Embodiments 1 and 2.

(2) As in Embodiments 1 and 2, the first stage nozzle is formed as a single crystal cast of an Ni-base super alloy. The Ni-base alloy comprises Cr 6 to 8%, Mo 0.5 to 1%, W 6 to 8%, Re 1 to 4%, Al 4 to 6%, Ta 6 to 9%, Co 0.5 to 10%, and Hf 0.03 to 0.13% in weight, some impurities that remain unavoidably, and Ni. This single crystal cast is manufactured in the same way as in Embodiment 1. The 10$^5$-hour 14-kgf/mm$^2$ temperature capacity is 900° to 940° C. The nozzle is provided with complex-formed cooling air holes inside it so that it may be cooled down during operation with compressed air supplied from those holes. Just like in Embodiment 1, the nozzle is provided with layers of alloy. The coating layers may be heat-shield coating layers just like in Embodiments 1 and 2.

(3) Thermal barrier coating layers are provided for the single crystal of the first stage blade as in Embodiment 1. The blade may also be provided with 4 heat-shield layers comprising a $Y_2O_3$ stabilized zirconia layer (surface), an alloy layer, a mixed layer of ceramics and alloy layer composited alloy, and an alloy layer.

Embodiment 4

Table 1 below shows the alloy composition of the first stage blade material used for the power generation gas turbine of the invention, the blade casting method (single crystal: SC, unidirectional solidification: DS, equiaxed crystal: CC), the 10$^5$-hour 14-kgf/mm$^2$ temperature capacity, and the weight loss by corrosion after a 75 weight % $Na_2SO_4$—25 weight % NaCl mixed salt full immersion test is carried out for it, then it is heated. Especially, since 1B5 and 1B6 contain at least one type of grain boundary reinforcing elements B, C, Hf, and Zr by 1 weight % or under in total, fine deposits such as carbide, etc. that exist at crystal grain boundaries can keep the strength of the grain boundaries even when grain boundaries are generated inside it. With this, the manufacturing yield of the nozzle can be improved more significantly.

Hereafter, the first stage blade alloy shown in Table 1 will be explained.

Cr improves the oxidation resistance and corrosion resistance of the alloy. Al is one of the main reinforcing elements to form the γ' phase, which is an intermetallic compound used to reinforce the eduction of Ni-base super heat-resistant alloy. The basic composition of the γ' phase is represented by $Ni_3Al$, but it is further reinforced when other elements of Ti, Ta, W, Mo, and Nb are applied a solid-solution treatment. Nb is, just like Re, an important additional element to improve the corrosion resistance of the alloy. Addition of Co allows the stacking fault energy of the alloy to be lowered. In the aspect of strength, Co can improve the creep strength in the comparatively low temperature range. In the high temperature range, it increases the degree of the solid-solution performance of the γ' phase and weaken the educing property. As a result, the creep strength in the high temperature range becomes insufficient. With those actions of Nb and Co that conflict with each other, Co has the optimized load also in the aspect of strength. Hf is an important element to improve the oxidation resistance and high temperature strength of the alloy. These effects appear even when it is added only by a very small quantity. Excessive addition of Hf causes the fusion point of the alloy to be lowered and the solid solution of the eutectic γ' phase to become incomplete. Re is solid-dissolved to the γ phase to reinforce the base and improve the corrosion resistance of the alloy. If it is added over 4%, however, it causes the harmful phases of Re—W, Re—Mo, Re—Ta, etc. to be educed.

TABLE 1

| | | | | | | | (First Stage Blade Alloy) | | | | | | | | | |
|---|---|---|---|---|---|---|---|---|---|---|---|---|---|---|---|---|
| No. | M.M. | Ni | C | Cr | Co | W | Re | Mo | Ta | Nb | Al | Ti | Hf | B | Zr | T.C.(°C.) | W.L.C.(mg/cm$^2$) |
| 1B1 | SC | bal. | — | 7.5 | 0.8 | 7.2 | 1.5 | 0.8 | 8.8 | 1.7 | 5.0 | — | 0.1 | — | — | 940 | 203 |
| 1B2 | SC | bal. | — | 7.5 | 1.0 | 9.5 | 1.4 | 0.8 | 7.2 | 1.7 | 5.2 | — | 0.1 | — | — | 940 | 289 |
| 1B3 | SC | bal. | — | 7.9 | 1.0 | 9.5 | 1.6 | 0.9 | 6.7 | 1.6 | 4.6 | — | 0.1 | — | — | 940 | 236 |
| 1B4 | SC | bal. | — | 6.6 | 9.6 | 6.4 | 3.0 | 0.6 | 6.5 | — | 5.6 | — | 0.1 | — | — | 930 | 533 |

TABLE 1-continued (First Stage Blade Alloy)

| No. | M.M. | Ni | C | Cr | Co | W | Re | Mo | Ta | Nb | Al | Ti | Hf | B | Zr | T.C.(°C.) | W.L.C.(mg/cm²) |
|---|---|---|---|---|---|---|---|---|---|---|---|---|---|---|---|---|---|
| 1B5 | SC/DS | bal. | 0.07 | 6.6 | 9.2 | 8.5 | 3.0 | 0.5 | 3.2 | — | 5.6 | 0.7 | 1.4 | 0.015 | 0.015 | 900 | 587 |
| 1B6 | SC/DS | bal. | 0.07 | 8.1 | 9.2 | 9.5 | — | 0.5 | 3.2 | — | 5.6 | 0.7 | 1.4 | 0.015 | 0.006 | 890 | 560 |

(Note: M.M. is Manufacuring Method, T.C. is Temperature Capacity, and W.L.C. is Weight Loss by Corrosion.)

Embodiment 5

Table 2 below shows the composition (weight %) of the Co-base alloy used as a material for the first stage nozzle of the power generation gas turbine of this invention, the casting method (single crystal: SC, unidirectional solidification: DS, isometric crystal: CC), and the $10^5$-hour 6-kgf/mm² temperature capacity. The welding property of the Co-base alloy is enough. In addition to those materials, 1B1 to 1B6 shown in Embodiment 4 can also be used as the materials for the first stage nozzle.

Hereafter, each alloy shown in Table 2 will be explained.

C is solid-dissolved into a matrix, as well as it forms a carbide, which is a reinforcing factor of the Co-base super alloy. In this case, C works as one of the main elements to control the strength of the alloy. In addition, the load of C affects the casting/welding properties of the alloy significantly. Cr is needed to keep the oxidation resistance of the alloy. W is added as a solid solution reinforcing element. Excessive addition of W causes the oxidation resistance to be deteriorated. B is added as an element to reinforce the grain boundary. It is effective to improve the high temperature ductility/strength, but excessive addition of the B also causes the welding property of the alloy to be deteriorated. Nb, Ta, Ti, Zr, and Hf are effective to form carbides efficiently. A small quantity mixed addition of those elements can suppress generation of harmful carbides to be educed to grain boundaries to improve the strength/toughness of the alloy more. Excessive addition of any of those elements, however, promotes forming of coarse carbides, which are unfavorable for the alloy. Re is added to improve the high temperature strength and corrosion resistance of the alloy.

TABLE 2

(First Stage Nozzle Alloy)

| No. | M.M. | Ni | C | Cr | Co | W | Re | Mo | Ta | Nb | Al | Ti | Hf | B | Zr | T.C.(°C.) |
|---|---|---|---|---|---|---|---|---|---|---|---|---|---|---|---|---|
| 1N1 | CC | 10.0 | 0.30 | 25.0 | bal. | 7.5 | — | — | 0.3 | 0.1 | — | 0.2 | — | 0.01 | 0.4 | 900 |
| 1N2 | CC | 10.0 | 0.25 | 29.0 | bal. | 7.0 | 1.0 | — | — | — | — | — | — | 0.01 | — | 840 |
| 1N3 | CC | 10.0 | 0.35 | 29.0 | bal. | 7.0 | — | — | 1.0 | — | — | 0.2 | 0.5 | 0.01 | 0.5 | 890 |
| 1N4 | CC | 10.0 | 0.40 | 29.5 | bal. | 7.0 | — | — | — | 0.25 | — | 0.2 | — | 0.01 | 0.15 | 860 |

(Note: M.M. is Manufacuring Method, T.C. is Temperature Capacity, and W.L.C. is Weight Loss by Corrosion.)

Embodiment 6

Table 3 shows the composition (weight %) of the alloy used as a material for the second stage and subsequent blades of the power generation gas turbine of this invention, the casting method (single crystal: SC, unidirectional solidification: DS, isometric crystal: CC), the $10^5$-hour 14-kgf/mm² temperature capacity, and the weight loss by corrosion after a 75 weight % $Na_2SO_4$—25 weight % NaCl mixed salt full immersion test is carried out for it, then it is heated at 940° C. for 50 hours.

The action of each alloy element is the same as that shown in Embodiment 4.

TABLE 3

(Second Stage Blade Alloy)

| No. | M.M. | Ni | C | Cr | Co | W | Re | Mo | Ta | Nb | Al | Ti | Hf | B | Zr | T.C(°C.) | W.L.C.(mg/cm²) |
|---|---|---|---|---|---|---|---|---|---|---|---|---|---|---|---|---|---|
| 2B1 | CC | bal. | 0.10 | 15.8 | 8.4 | 2.7 | — | 1.7 | 1.6 | 0.7 | 3.5 | 3.4 | — | 0.011 | 0.04 | 845 | 37 |
| 2B2 | CC | bal. | 0.10 | 14.0 | 9.5 | 3.8 | — | 1.5 | 2.8 | — | 3.0 | 4.9 | — | 0.015 | 0.01 | 850 | 45 |

(Note: M.M. is Manufacuring Method, T.C. Tempeature Capacity, and W.L.C. is Weight Loss by Corrosion.)

Embodiment 7

Table 4 shows the composition (weight %) of the alloy used as a material for the second stage and subsequent nozzles of the power generation gas turbine of this invention, the casting method (single crystal: SC, unidirectional solidification: DS, isometric crystal: CC), the $10^5$-hour 6-kgf/mm² temperature capacity, and the weldability. The action of each alloy element is almost the same as that shown in Embodiment 4. In this embodiment, however, the weldability of the alloy is regarded as more important than those shown in Embodiments 4 and 6. In this embodiment, an Ni-base alloy is used. Unlike the Co-base alloy, the normal weldability of this alloy is lower. Thus, it will be important to further improve the weldability to be applicable for the real power generation gas turbine. This is the point of difference of the alloy used in this embodiment from the Ni-base alloy used for blades in Embodiment 6 (Table 3). In Table 4, 2N3 is excellent in the high temperature strength of the alloy, but its welding property is lower than that of 2N1 and 2N2. 2N2 is the most excellent in the weldability, but its high temperature strength is low. Therefore, 2N1 will be the most excellent when the balance between weldability and high temperature strength is taken into consideration. This is achieved by controlling the amount of Al+Ti and effective addition of W strictly. The weldability is evaluated by checking whether or not cracks are generated in the beads formed with 1-path TIG-welding in an area of 80 mm×8 mm on the alloy under a pre-heating temperature of 400° C. or under.

Embodiment 8

Another embodiment of the power generation gas turbine of this invention will be explained below.

In the gas turbine described in this embodiment, the first stage turbine blade is cooled down strongly to control the temperature of the blade metal within 800° to 900° C. when the temperature at the turbine gas inlet is 1400° to 1500° C. The first stage to final stage blades use an alloy that has a 2N1 to 2N3 equiaxed crystal structure. These nozzles use the same materials as in Embodiment 1. In other words, the blade 0 nozzle uses a completely equiaxed crystal structured alloy. The nozzle is provided with a thermal barrier coating layer, an alloy coating layer to improve the corrosion resistance of the alloy, and an Al or Cr dispersed coating layer as needed. The turbine exhaust gas temperature will become

TABLE 4

(Second Stage and Subsequet Nozzle Alloy)

| No. | M.M. | Ni | C | Cr | Co | W | Fe | Mo | Ta | Nb | Al | Ti | Zr | B | W.P. | T.C.(°C.) |
|---|---|---|---|---|---|---|---|---|---|---|---|---|---|---|---|---|
| 2N1 | CC | bal. | 0.10 | 23.0 | 22.0 | 7.5 | — | — | 1.2 | — | 1.6 | 2.7 | — | 0.01 | ≠ | 875 |
| 2N2 | CC | bal. | 0.10 | 22.0 | 19.0 | 2.0 | — | — | 1.0 | — | 1.2 | 2.3 | — | 0.01 | ≠ | 843 |
| 2N3 | CC | bal. | 0.15 | 22.5 | 19.0 | 2.0 | — | — | 1.4 | — | 1.9 | 3.7 | 0.10 | 0.01 | ≒ | 887 |

(Note 1: M.M. is Manufacuring Method, W.P. is Welding Property, and T.C. is Temperature Capacity.
Note 2: In the above table, Welding property ≠: No cracks are generated in the beads formed with 1-pass Tig-welding in an area of 80 mm × 8 mm on the alloy under a pre-heating temperature of 400° C. or under.)

The nozzles used in this embodiment are manufactured in the same way as in Embodiment 1.

Figure 13:
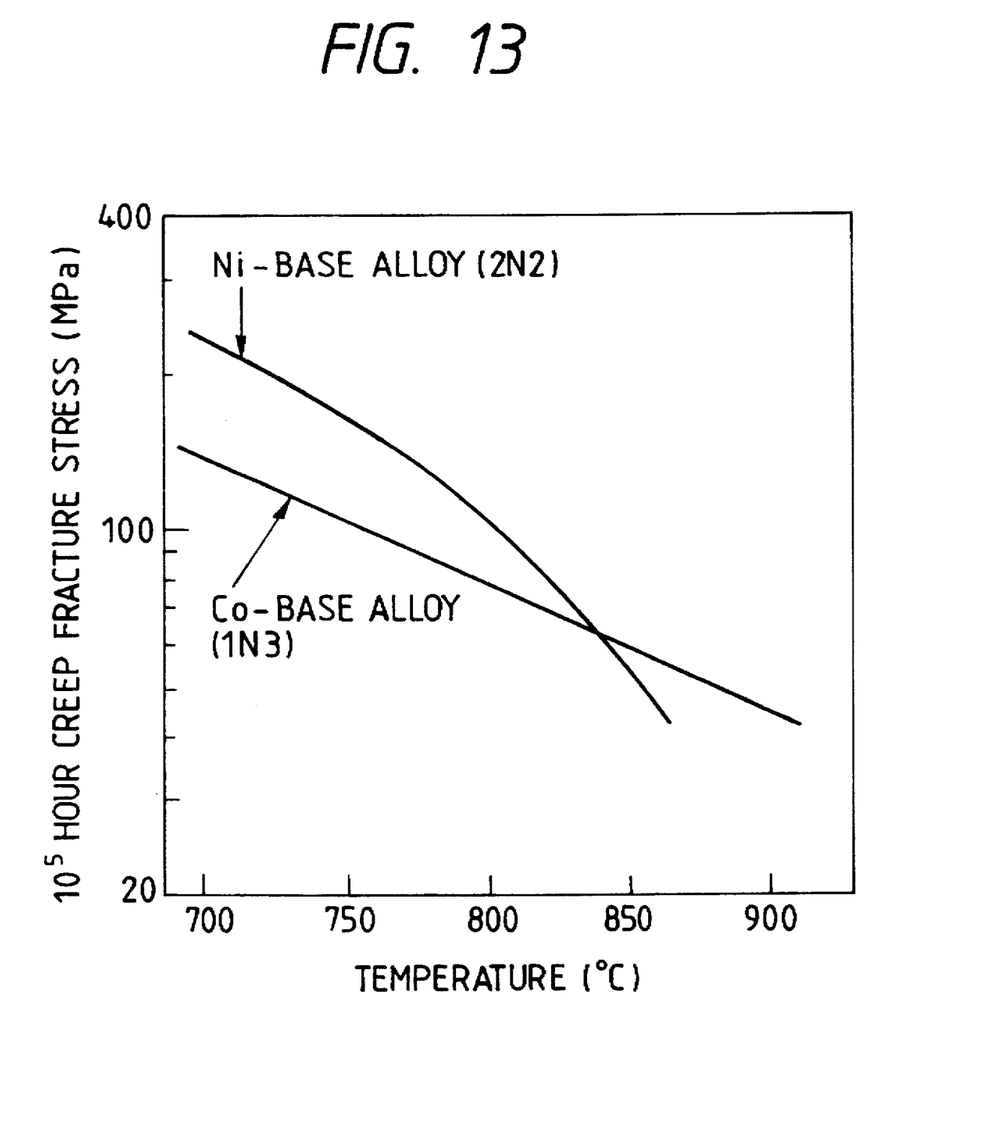
FIG. 13 is a diagram in which the vertical axis indicates the $10^5$-hour creep fracture stress and the horizontal axis indicates the temperature, and which shows the comparison of the material strength between Ni-base nozzle material and Co-base nozzle material used for the gas turbine of the invention.

The Co-base alloy shown in Embodiment 5 is used as the material of the first stage nozzle and the Ni-base alloy shown in this embodiment is used as the material of the second stage and subsequent nozzles. This combination of alloys is effective as shown below. FIG. 13 shows the temperature dependency of the creep strength of the first stage nozzle 1N3 and the second stage and subsequent nozzles 2N2. The vertical axis represents the braking stress when having held for $10^5$-hours, while the horizontal axis the holding temperature. As shown here, the creep strength of the Ni-base alloy for nozzles is higher than that of the Co-base alloy at 840° C. or under. In the high temperature range, however, the Co-base alloy creep strength is higher than that of the Ni-base alloy. Note that the 2N2 Ni-base alloy sacrifices the strength to satisfy the required weldability in this case. In a simple comparison, therefore, the strength of the Ni-base alloy is lower than that of the Ni-base alloy for the blades in Embodiment 6. In this invention, the temperature at the gas inlet to the first stage nozzle is 1500° C. The temperature of the gas inlet to the second stage nozzle is 1100° C. The temperature of the gas inlet to the third nozzle is 850° C. The first stage nozzle metal temperature will become 900° C. or over even when cooling of the nozzle is taken into consideration. Since this temperature indicates that the Co-base alloy is stronger than the Ni-base alloy for nozzles, preferably the Co-base alloy that is excellent in the welding property should be used for the first stage nozzle. On the other hand, the metal temperature of the second stage and subsequent nozzles becomes 800° C. or under. In this temperature range, the creep strength of the Ni-base alloy for nozzles is higher than that of the Co-base alloy. Preferably, the Ni-base alloy should therefore be used for the second stage and subsequent nozzles. For a gas turbine in which the temperature at the turbine inlet becomes in the 1500° C. range, the Co-base alloy should be used for the first stage nozzle and the Ni-base alloy should be used for the second stage and subsequent nozzles.

550° to 650° C. When steam turbines are also used to realize a combined power generation system, the total power generation efficiency will be improved more significantly.

According to this invention, a high efficiency gas turbine of 37% or over in the LHV value can be provided by adopting the optimized configuration of the blade and nozzle materials for a gas turbine of the 1500° C. class turbine gas inlet temperature.

What is claimed is:

1. A power generation gas turbine equipped with a compressor; a combustor; turbine blades fixed to a turbine disc; and turbine nozzles provided in correspondence to said turbine blades, wherein first stage turbine blades are made of an alloy whose $10^5$-hour 14-kgf/mm$^2$ temperature capacity is 920° C. or over, second stage turbine blades are made of an alloy whose $10^5$-hour 14-kgf/mm$^2$ temperature capacity is 800° C. or over, first stage turbine nozzles are made of an alloy whose $10^5$-hour 6-kgf/mm$^2$ temperature capacity is 900° C. or over, second stage turbine nozzles are made of an alloy whose $10^5$-hour 6-kgf/mm$^2$ temperature capacity is 800° C. or over, said first stage turbine blades and said first stage turbine nozzles are made of a Ni-base single crystal cast alloy, said second stage turbine blades are formed as Ni-base alloy casts, and wherein the Ni-base alloy used for said second stage turbine blades is made of a Ni-base alloy comprising Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, and B 0.005 to 0.02% by weight.

2. A power generation gas turbine equipped with a compressor;

a combustor;

turbine blades fixed to a turbine disc; and turbine nozzles provided in correspondence to said turbine blades, wherein said gas turbine is made to be workable under the conditions that the temperature at a gas inlet to first stage turbine nozzles is 1450° to 1550° C., the metal temperature of first stage turbine blades is 920° C. or over, and the gas turbine exhaust gas temperature is 590° to 650° C., whereby the power generation efficiency is 37% or over, said first stage turbine nozzles and said first stage turbine blades each are made of a Ni-base single crystal cast alloy, and second stage turbine blades are formed as Ni-base alloy casts, and wherein the Ni-base alloy used for said second stage turbine blades is made of an Ni-base alloy comprising Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, and B 0.005 to 0.02% by weight.

3. The power generation gas turbine described in claim 2, wherein said first stage turbine blades are made of an alloy whose $10^5$-hour 14-kgf/mm² temperature capacity is 920° C. or over, second and subsequent stage turbine blades are made of an alloy whose $10^5$-hour 14-kgf/mm² temperature capacity is 800° C. or over, said first stage turbine nozzles are made of an alloy whose $10^5$-hour 6-kgf/mm² temperature capacity is 900° C. or over, and second stage and subsequent turbine nozzles are made of an alloy whose $10^5$-hour 6-kgf/mm² temperature capacity is 800° C. or over.

4. The power generation gas turbine described in claim 3, wherein said alloy that forms said first stage turbine blades has a $10^5$-hour 14-kgf/mm² temperature capacity of 920° C. or over and a corrosion weight loss of 600 mg/cm² or under after a 75 weight % $Na_2SO_4$-25 weight % NaCl mixed salt full immersion test is carried out and said alloy is heated at 940° C. for 50 hours.

5. The power generation gas turbine described in claim 3, wherein said alloy that forms said first stage turbine nozzle has a $10^5$-hour 6-kgf/mm² temperature capacity of 900° C. and is heat treated at a pre-heating temperature of 400° C. or under whereby no cracks will be generated inside the bead formed with 1-path TIG-welding in a 80 mm×4 mm area on said first stage turbine nozzle alloy.

6. A power generation gas turbine equipped with a compressor; a combustor; turbine blades arranged in three or more stages and fixed to a turbine disc; and turbine nozzles arranged in three or more stages in correspondence to said turbine blades, wherein first stage turbine blades and first stage turbine nozzles are formed as Ni-base alloy single crystal casts, and second stage turbine blades and nozzles are formed as Ni-base alloy casts, the Ni-base alloy used for the second stage turbine blades is made of an Ni-base alloy Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, and B 0.005 to 0.02% by weight, and the Ni-base alloy cast used for the second stage turbine nozzles is made of an Ni-base alloy comprising Cr 21 to 24%, Co 18 to 23%, C 0.05 to 0.20%, W 1 to 8%, Al 1 to 2%, Ti 2 to 3%, Ta 0.5 to 1.5%, and B 0.05 to 0.15% by weight.

7. The power generation gas turbine described in claim 6, wherein the Ni-base alloy used for said second stage and subsequent turbine nozzles is heat-treated at a preheating temperature of 400° C. or under whereby no cracks will be generated inside the bead formed by 1-path TIG-welding in an area of 80 mm×8 mm on the alloy.

8. The power generation gas turbine described in claim 6, wherein said first stage turbine blade is provided with thermal barrier coating layers including a ceramic one.

9. The power generation gas turbine described in claim 6, wherein the alloy used for the first stage turbine blades contains at least one of B, C, Hf, and Zr elements by weight 1% or under.

10. The power generation gas turbine described in claim 6, wherein said first stage turbine blades are made of an alloy whose $10^5$-hour 14-kgf/mm² temperature capacity is 920° C. or over.

11. A power generation gas turbine equipped with a compressor;

a combustor;

turbine blades fixed to a turbine disc; and turbine nozzles provided in correspondence to said turbine blades, wherein said gas turbine is made to be workable under the condition that the temperature at a gas inlet to first stage turbine nozzles of said turbine blades is within 1400° to 1500° C., the metal temperature of first stage blades is 800° to 900° C., and the gas turbine exhaust gas temperature is within 550° to 650° C., said first stage turbine blades and first stage turbine nozzles are formed as Ni-base alloy single crystal casts and second stage blades and nozzles are formed as Ni-base alloy casts, and the Ni-base alloy cast used for said second stage turbine nozzles is made of a Ni-base alloy comprising Cr 21 to 24%, Co 18 to 23%, C 0.05 to 0.20%, W 1 to 8%, Al 1 to 2%, Ti 2 to 3%, Ta 0.5 to 1.5%, and B 0.05 to 0.15% by weight.

12. A power generation gas turbine equipped with a compressor; a combustor; turbine blades arranged in three or more stages and fixed to a turbine disc; and turbine nozzles arranged in three or more stages in correspondence to said turbine blades, wherein first stage turbine blades and first stage turbine nozzles are formed as Ni-base alloy single crystal casts and second stage turbine blades and nozzles are formed as Ni-base alloy casts, and wherein the single crystal cast is made of an Ni-base alloy comprising Cr 6 to 8%, Mo 0.5 to 1%, W 6 to 9.5%, Re 1 to 4%, Al 4 to 6%, Ta 6 to 9%, Co 0.5 to 10%, and Hf 0.03 to 0.13% by weight.

13. A power generation gas turbine equipped with a compressor; a combustor; turbine blades arranged in three or more stages and fixed to a turbine disc; and turbine nozzles arranged in three or more stages in correspondence to said turbine blades, wherein first stage turbine blades and first stage turbine nozzles are formed as Ni-base alloy single crystal casts and second stage turbine blades and nozzles are formed as Ni-base alloy casts, and wherein the single crystal cast is an Ni-base alloy comprising Cr 6 to 8%, Mo 0.5 to 1%, W 6 to 9.5%, Re 1 to 4%, Al 1 to 6%, Ta 6 to 9%, Co 0.5 to 10%, Hf 0.03 to 0.13%, and either or both of Ti and Nb 0.1 to 2% by weight.

14. A power generation gas turbine equipped with a compressor; a combustor; turbine blades arranged in three or more stages and fixed to a turbine disc; and turbine nozzles arranged in three or more stages in correspondence to said turbine blades, wherein first stage turbine blades and first stage turbine nozzles are formed as Ni-base alloy single crystal casts and second stage turbine blades and nozzles are formed as Ni-base alloy casts, and wherein the Ni-base alloy used for the second stage turbine blades is made of an Ni-base alloy comprising Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, and B 0.005 to 0.02% by weight.

15. A power generation gas turbine equipped with a compressor; a combustor; turbine blades arranged in three or more stages and fixed to a turbine disc; and turbine nozzles arranged in three or more stages in correspondence to said turbine blades, wherein first stage turbine blades and first stage turbine nozzles are formed as Ni-base alloy single crystal casts and second stage turbine blades and nozzles are formed as Ni-base alloy casts, and wherein the Ni-base alloy cast used for the second stage turbine nozzles is made of an Ni-base alloy comprising Cr 21 to 24%, Co 18 to 23%, C 0.05 to 0.20%, W 1 to 8%, Al 1 to 2%, Ti 2 to 3%, Ta 0.5 to 1.5%, and B 0.05 to 0.15% by weight.

16. A power generation gas turbine equipped with a compressor; a combustor; turbine blades arranged in three or more stages and fixed to a turbine disc; and turbine nozzles arranged in three or more stages in correspondence to said turbine blades, wherein first stage turbine blades and first stage turbine nozzles are formed as Ni-base alloy single crystal casts and second stage turbine blades and nozzles are formed as Ni-base alloy casts, and wherein the turbine disc is made of heat resistant steel that has a full-tempered martensite texture comprising C 0.05 to 0.2%, Si 0.5% or under, Mn 1% or under, Cr 8 to 13%, Ni 3% or under, Mo 1.5 to 3%, V 0.05 to 0.3%, Nb 0.02 to 0.2%, and N 0.02 to 0.1% by weight.

17. A power generation gas turbine equipped with a compressor; a combustor; turbine blades fixed to a turbine disc; and turbine nozzles provided in correspondence to said turbine blades, wherein first stage turbine blades are made of an alloy whose $10^5$-hour 14-kgf/mm$^2$ temperature capacity is 920° C. or over, second stage turbine blades are made of an alloy whose $10^5$-hour 6-kgf/mm$^2$ temperature capacity is 800° C. or over, first stage turbine nozzles are made of an alloy whose $10^5$-hour 6-kgf/mm$^2$ temperature capacity is 900° C. or over, and second stage turbine nozzles are made of an alloy whose $10^5$-hour 6-kgf/mm$^2$ temperature capacity is 800° C. or over; and wherein the alloy used for said first stage turbine blades is an Ni-base single crystal cast alloy which comprises Cr 6 to 8%, Mo 0.5 to 1%, W 6 to 8%, Re 1 to 4%, Al 4 to 6%, Ta 6 to 9%, Co 0.5 to 10%, Hf 0.03 to 0.13% by weight and the balance Ni and unavoidable impurities.

18. A power generation gas turbine equipped with a compressor;

a combustor;

turbine blades fixed to a turbine disc; and turbine nozzles provided in correspondence to said turbine blades, wherein said gas turbine is made to be workable under the conditions that the temperature at a gas inlet to a first stage turbine nozzles of said turbine blades is 1450° to 1550° C., the metal temperature of first stage blades is 920° C. or over, and the gas turbine exhaust gas temperature is 590° to 650° C., whereby the power generation efficiency is 37% or over;

said first stage turbine blades are made of an alloy whose $10^5$-hour 14-kgf/mm$^2$ temperature capacity is 920° C. or over, second stage turbine blades are made of an alloy whose $10^5$-hour 14-kgf/mm$^2$ temperature capacity is 800° C. or over, said first stage turbine nozzles are made of an alloy whose $10^5$-hour 6-kgf/mm$^2$ temperature capacity is 900° C. or over, and second stage turbine nozzles are made of an alloy whose $10^5$-hour 6-kgf/mm$^2$ temperature capacity is 800° C. or over; and wherein the alloy used for said first stage turbine blades is an Ni-base single crystal cast alloy which comprises Cr 6 to 8%, Mo 0.5 to 1%, W 6 to 8%, Re 1 to 4%, Al 4 to 6%, Ta 6 to 9%, Co 0.5 to 10%, Hf 0.03 to 0.13% by weight and balance Ni and unavoidable impurities.

19. A power generation gas turbine equipped with a compressor, a combustor, turbine blades fixed to a turbine disc, and turbine nozzles provided in correspondence to said turbine blades, wherein first stage turbine blades are made of a Ni-base single crystal alloy whose $10^5$-hour 14-kgf/mm$^2$ temperature capacity is 920° C. or over, second stage turbine blades are made of a Ni-base polycrystal alloy whose $10^5$-hour 14-kgf/mm$^2$ temperature capacity is 800° C. or over, first stage turbine nozzles are made of a Ni-base single crystal alloy whose $10^5$-hour 6-kgf/mm$^2$ temperature capacity is 900° C. or over, second stage turbine nozzles are made of a Ni-base polycrystal alloy whose $10^5$-hour 6-kgf/mm$^2$ temperature capacity is 800° C. or over, said second stage turbine blades are formed as Ni-base alloy casts, and wherein the Ni-base alloy used for said second stage turbine blades is made of an Ni-base alloy comprising Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, and B 0.005 to 0.02% by weight.

20. A power generation gas turbine equipped with a compressor, a combustor, three or more stage turbine blades fixed to a turbine disc, and three or more turbine nozzles provided in correspondence to said turbine blades, wherein the temperature at a gas inlet to first stage turbine nozzles of said turbine blades is 1450° to 1550° C., the blade portion metal temperature of first stage blades is 920° C. or over, the gas turbine exhaust gas temperature is 590° to 650° C., the power generation efficiency is 37% or over, said first stage turbine blades are made of a Ni-base single crystal alloy whose $10^5$-hour 14-kgf/mm$^2$ temperature capacity is 920° C. or over, second stage turbine blades are made of a Ni-base polycrystal alloy whose $10^5$-hour 14-kgf/mm$^2$ temperature capacity is 800° C. or over, said first stage turbine nozzles are made of a Ni-base single crystal alloy whose $10^5$-hour 6-kgf/mm$^2$ temperature capacity is 900° C. or over, second stage turbine nozzles are made of a Ni-base polycrystal alloy whose $10^5$-hour 6-kgf/mm$^2$ temperature capacity is 800° C. or over, said second stage nozzles are formed as Ni-base alloy casts, and wherein the Ni-base alloy used for said second stage nozzles is made of an Ni-base alloy comprising Cr 21 to 24% Co 18 to 23%, Co 0.05 to 0.20%, W 1 to 8%, Al 1 to 2%, Ti 2 to 3%, Ta 0.5 to 1.5%, and B 0.05 to 0.15% by weight.

21. A power generation gas turbine equipped with a compressor;

a combustor;

turbine blades fixed to a turbine disc; and turbine nozzles provided in correspondence to said turbine blades, wherein the temperature at a gas inlet to first stage turbine nozzles of said turbine blades is 1450° to 1550° C., the metal temperature of first stage blades is 800° to 900° C., the gas turbine exhaust gas temperature is within 550 to 650° C., said first stage turbine blades are made of a Ni-base single crystal alloy whose $10^5$-hour 14-kgf/mm$^2$ temperature capacity is 920° C. or over, second stage turbine blades are made of a Ni-base polycrystal alloy whose $10^5$-hour 14-kgf/mm$^2$ temperature capacity is 800° C. or over, said first stage turbine nozzles are made of a Ni-base single crystal alloy whose $10^5$-hour 6-kgf/mm$^2$ temperature capacity is 900° C. or over, second stage turbine nozzles are made of a Ni-base polycrystal alloy whose $10^5$-hour 6-kgf/mm$^2$ temperature capacity is 800° C. or over, said second stage turbine blades are formed as Ni-base alloy casts, and wherein the Ni-base alloy used for said second stage turbine blades is made of an Ni-base alloy comprising Cr 12 to 16%, Mo 0.5 to 2%, W 2 to 5%, Al 2.5 to 5%, Ti 3 to 5%, Ta 1.5 to 3%, Co 8 to 10%, C 0.05 to 0.15%, and B 0.005 to 0.02% by weight.

\* \* \* \* \*